(12) United States Patent
Swinkels et al.

(10) Patent No.: US 9,407,359 B2
(45) Date of Patent: Aug. 2, 2016

(54) LOCALIZED NETWORK REPAIR SYSTEMS AND METHODS

(71) Applicants: Gerard Leo Swinkels, Ottawa (CA); Mohit Chhillar, Pitam Pura (IN); Anurag Prakash, Noida (IN); Dominic Richens, Ottawa (CA); Rajagopalan Kannan, Gurgaon (IN)

(72) Inventors: Gerard Leo Swinkels, Ottawa (CA); Mohit Chhillar, Pitam Pura (IN); Anurag Prakash, Noida (IN); Dominic Richens, Ottawa (CA); Rajagopalan Kannan, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 37 days.

(21) Appl. No.: 14/482,023

(22) Filed: Sep. 10, 2014

(65) Prior Publication Data
US 2016/0036520 A1    Feb. 4, 2016

(30) Foreign Application Priority Data
Jul. 30, 2014    (IN) ............................ 2152/DEL/2014

(51) Int. Cl.
*H04B 10/00*    (2013.01)
*H04B 10/03*    (2013.01)

(52) U.S. Cl.
CPC ....................................... *H04B 10/03* (2013.01)

(58) Field of Classification Search
USPC ......................................................... 398/1–9
See application file for complete search history.

(56) References Cited

U.S. PATENT DOCUMENTS

| | | | |
|---|---|---|---|
| 7,027,388 B2 | 4/2006 | Wen et al. | |
| 7,330,425 B1 | 2/2008 | Gulati et al. | |
| 7,391,720 B1 * | 6/2008 | Kuditipudi | H04J 3/085 370/225 |
| 8,289,879 B2 | 10/2012 | Brown | |
| 8,559,812 B2 * | 10/2013 | Oltman | H04J 3/14 398/1 |
| 8,682,160 B2 | 3/2014 | Prakash et al. | |
| 8,750,706 B2 | 6/2014 | Boertjes et al. | |
| 8,818,198 B2 | 8/2014 | Trnkus et al. | |
| 9,049,133 B2 * | 6/2015 | Boutros | H04L 45/14 |
| 2002/0171886 A1 * | 11/2002 | Wu | H04L 45/02 398/20 |
| 2010/0054731 A1 * | 3/2010 | Oltman | H04J 3/14 398/1 |
| 2010/0104282 A1 | 4/2010 | Khan et al. | |
| 2013/0177305 A1 | 7/2013 | Prakash et al. | |
| 2013/0272318 A1 | 10/2013 | Swinkels et al. | |
| 2013/0308948 A1 | 11/2013 | Swinkels et al. | |
| 2013/0336192 A1 * | 12/2013 | Zhao | H04L 45/16 370/312 |
| 2014/0126899 A1 | 5/2014 | Prakash et al. | |
| 2014/0205278 A1 | 7/2014 | Kakkar et al. | |

* cited by examiner

*Primary Examiner* — Agustin Bello
(74) *Attorney, Agent, or Firm* — Clements Bernard PLLC; Christopher L. Bernard; Lawrence A. Baratta, Jr.

(57) ABSTRACT

A localized repair method in a network using a control plane includes, responsive to a failure on a local repair segment defined on a connection traversing the network, generating a release message in the control plane; attempting a local repair on the local repair segment; if the local repair is unsuccessful, transmitting the release message to redial the connection; and, if the local repair is successful, signaling a new sub-path based on the local repair. A controller and a network are also disclosed.

15 Claims, 12 Drawing Sheets

LOCALIZED NETWORK REPAIR SYSTEMS AND METHODS

CROSS-REFERENCE TO RELATED APPLICATION(S)

The present patent application/patent claims the benefit of priority of Indian Patent Application No. 2152/DEL/2014, filed on Jul. 30, 2014, and entitled "LOCALIZED NETWORK REPAIR SYSTEMS AND METHODS," the contents of which are incorporated in full by reference herein.

FIELD OF THE DISCLOSURE

The present disclosure relates generally to networking systems and methods. More particularly, the present disclosure relates to localized network repair systems and methods such as for the photonic domain and the Optical Transport Network (OTN) domain.

BACKGROUND OF THE DISCLOSURE

Optical network control planes provide automatic allocation of network resources in an end-to-end manner. Exemplary control planes may include Automatically Switched Optical Network (ASON) as defined in ITU-T G.8080/Y.1304, Architecture for the automatically switched optical network (ASON), the contents of which are herein incorporated by reference; Generalized Multi-Protocol Label Switching (GMPLS) Architecture as defined in IETF Request for Comments (RFC): 3945 and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at one or more layers, and establishing connections there between. As described herein, these control planes deal with routing signals at Layers 0, 1, and 2, i.e., photonic signals, time division multiplexing (TDM) signals such as, for example, Synchronous Optical Network (SONET), Synchronous Digital Hierarchy (SDH), Optical Transport Network (OTN), Ethernet, MPLS, and the like.

Conventionally, in a control plane-enabled network, when a failure interrupts a call path, the call is torn down and the head end redials the call. At the photonic layer (e.g., Dense Wave Division Multiplexing (DWDM)), gracefully adding and removing a call from the network takes time and the repair action is limited by photonic constraints (e.g., reach of an optical modem). In OTN, connections can be referred to as High Order (HO) where there is a single large client (i.e., an Optical channel Data Unit-k (ODUk) in an Optical channel Transport Unit-k (OTUk)) or Low Order (LO) where there is multiplexing (i.e., an ODUj into an ODUk).

As restoration speed is important, and removing unnecessary work is desirable. Conventionally, there are single link techniques that involve a single span between adjacent nodes such as described in commonly-assigned U.S. Pat. No. 7,391,720, "LOCAL SPAN MESH RESTORATION," the contents of which are incorporated by reference herein. However, it would be desirable to have multi-span techniques or techniques based on attributes of the photonic domain or OTN domain, for local repair, which can improve restoration speed, avoid DWDM changes when necessary, and/or prevent HO/LO modifications in OTN.

BRIEF SUMMARY OF THE DISCLOSURE

In an exemplary embodiment, a localized repair method in a network using a control plane includes, responsive to a failure on a local repair segment defined on a connection traversing the network, generating a release message in the control plane; attempting a local repair on the local repair segment; if the local repair is unsuccessful, transmitting the release message to redial the connection; and, if the local repair is successful, signaling a new sub-path based on the local repair. The local repair can include releasing the connection on the local repair segment while maintaining the connection outside of the local repair segment; and installing the new sub-path in the local repair segment. The local repair segment can be between two boundary nodes on a path of the connection, and wherein the boundary nodes are nodes with three or more degrees. The localized repair method can further include designating one of the two boundary nodes to perform the local repair and signal the other of the two boundary nodes. Optionally, the local repair segment is between optical-electrical conversion points of the connection. Alternatively, the local repair segment is a High Order (HO) Optical Transport Network (OTN) multiplexing segment of the connection.

The localized repair method can further include changing a wavelength in the new sub-path to avoid wavelength blocking. The release message is stored at the local repair segment while the local repair is performed to ensure that network-wide involvement is avoided unless the repair is unsuccessful. The connection can be one of a Subnetwork Connection (SNC), Subnetwork Connection Protection (SNCP), and a Label Switched Path (LSP). The failure is a regenerator failure at a boundary node of the local repair segments and the local repair comprises switching to another regenerator located at the boundary node with a wavelength retuned thereon. The local repair can be determined as unsuccessful based on any of a crankback in setup in the local repair, an inactivity timer expiration, and violating Absolute Route Diversity requirements.

In another exemplary embodiment, a controller includes an interface communicatively coupled to one or more nodes in a network; a processor communicative coupled to the interface; and memory storing computer-executable instructions that, when executed, cause the processor to: obtain a path for a connection in the network operating a control plane; and utilize local repair segments on the connection in the network based on boundary points in the path, wherein the boundary points are nodes between which the connection has an ability to be locally repaired, wherein the boundary points are any of optical-electrical conversion points or Optical Transport Network (OTN) multiplexing points, and wherein the control plane is configured, upon a failure in the local repair segments, to attempt a local repair first without network-wide involvement. The local repair segments can be determined based on optical-electrical conversion points of the connection. The local repair segments can be determined based on High Order (HO) Optical Transport Network (OTN) multiplexing segments of the connection in the network.

Responsive to the failure, a wavelength in the local repair segments can be changed to avoid wavelength blocking. In the local repair segments, network-wide signaling of a release message can be constrained until the local repair fails or if the local repair is successful to avoid network-wide involvement in the failure for the connection during the local repair. The failure can include a regenerator failure at one of the boundary points and the local repair can include switching to another regenerator located at the one of the at boundary points with a wavelength retuned thereon. The local repair can be determined unsuccessful based on any of a crankback in setup in the local repair, an inactivity timer expiration, and violating Absolute Route Diversity requirements.

In yet another exemplary embodiment, a network includes a plurality of nodes; a plurality of links interconnecting the plurality of nodes; a control plane operated between the plurality of nodes; a connection with a path through some of the plurality of links between two nodes of the plurality of nodes, one of the two nodes is a source node and another of the two nodes is a destination node, and wherein the path includes two boundary nodes; and a local repair segment defined on the path between the two boundary nodes, wherein, upon a failure in the local repair segment, control plane signaling to tear down the connection is store within the local repair segment such that a local repair is attempted first, and if the local repair is unsuccessful, the control plane signaling is released for a tear down of the connection and a redial. The two boundary nodes can be any of optical-electrical conversion points or Optical Transport Network (OTN) multiplexing points.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, localized network repair systems and methods such as for the photonic domain and the Optical Transport Network (OTN) domain are described. From an abstract perspective, the localized network repair systems and methods consider a local repair segment that can be defined based on attributes in the photonic domain or the OTN domain. That is, the local repair segment may not be a single link, but it does not require mesh restoration or end-to-end call redialing (which involve the network). The local repair segment enables the localized network repair systems and methods to perform local repair without involvement of the head end or source nodes or other nodes necessarily. For example, in the photonic domain, the local repair segment may include an electrical-optical-electrical (EOE) segment, and in the case of a transceiver failure, the localized network repair systems and methods enable the network to switch to another transceiver for localized repair instead of involving the network. Such a technique advantageously avoids adding/removing wavelengths requiring optical control loops, avoid network-wide messaging, etc. In another example, in the OTN domain, the local repair segment may include segments where a connection is carried HO versus LO. In summary, the localized network repair systems and methods introduce the local repair segments which are segments that lend themselves to localized repair and where avoiding network-wide repair has advantages (e.g., removing wavelength add/delete requirements, losing control plane signaling in OTN because of a clock transient, etc.).

Figure 1:
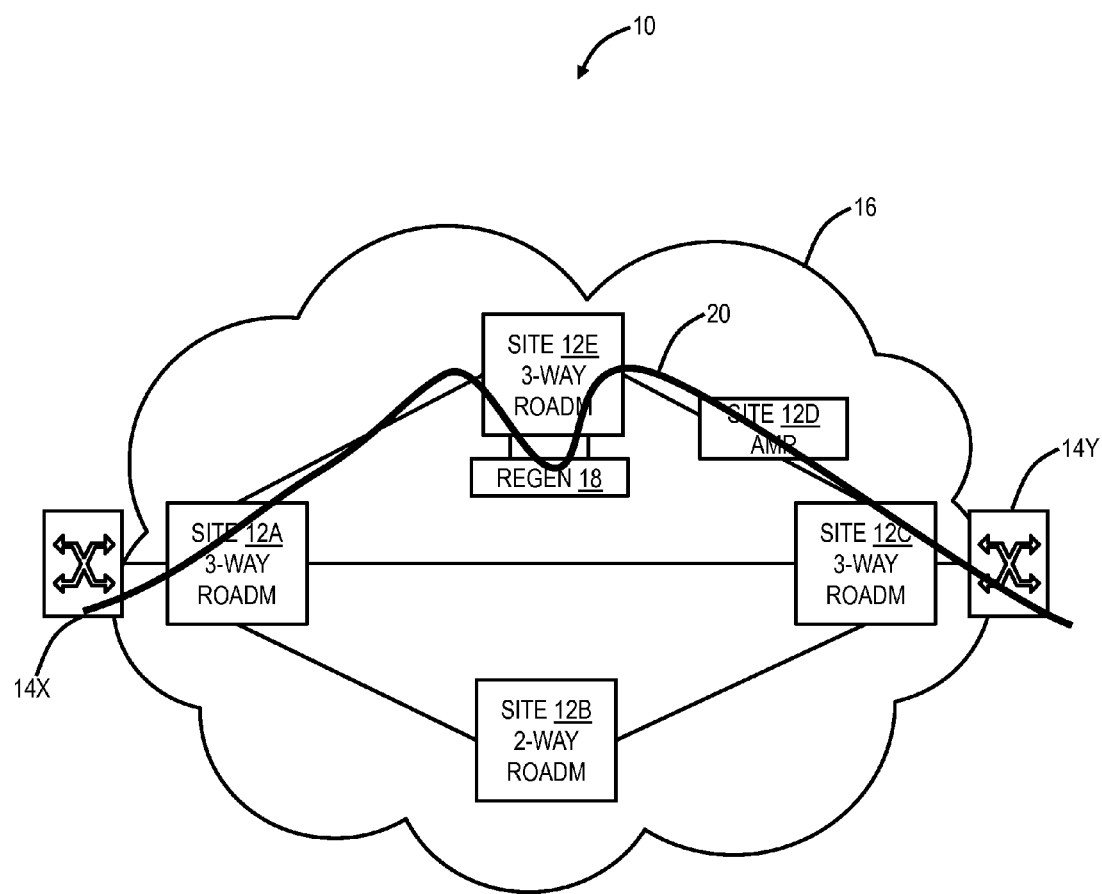
FIG. 1 is a network diagram of an exemplary network illustrating a photonic layer and an exemplary connection thereon.
Figure 2:
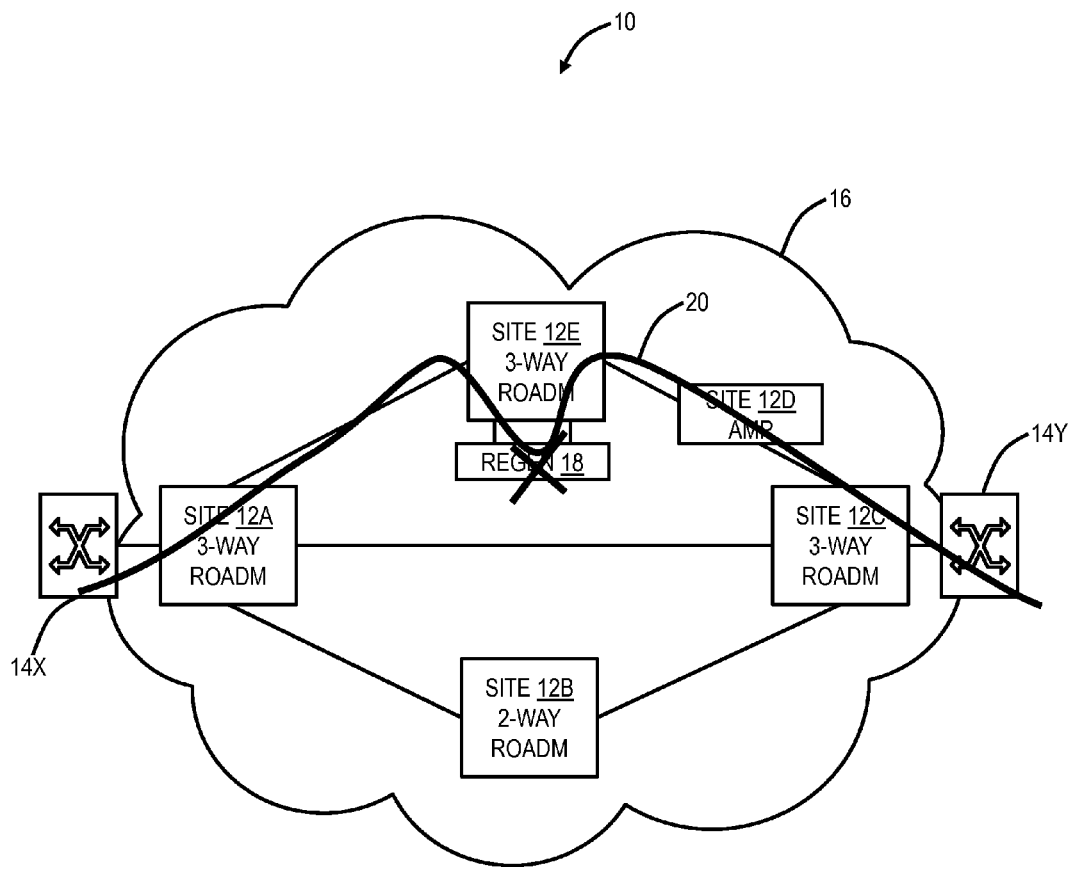
FIG. 2 is a network diagram of the exemplary network of FIG. 1 illustrating a fault at the photonic layer affecting the exemplary connection thereon.
Figure 3:
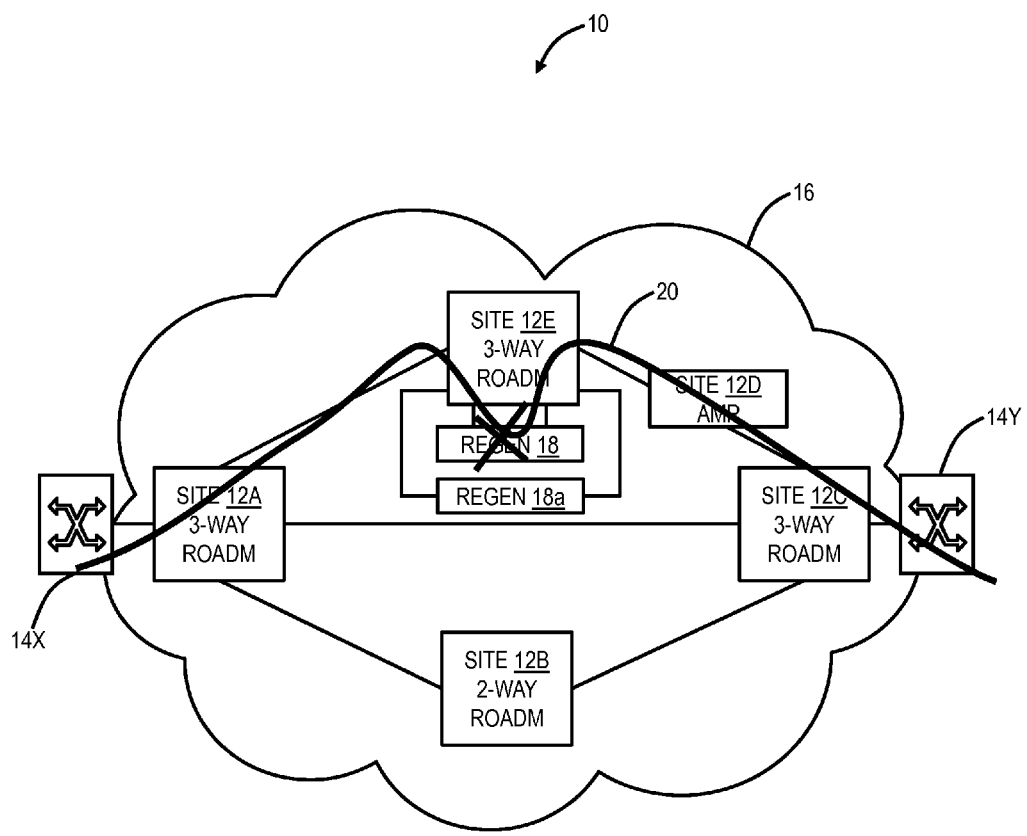
FIG. 3 is a network diagram of the exemplary network of FIGS. 2-3 illustrating the fault at the photonic layer and an associated local repair.

Referring to FIGS. 1-3, in exemplary embodiments, network diagrams illustrate an exemplary network 10 for describing the localized network repair systems and methods. The network 10 includes a photonic layer formed by sites 12A, 12B, 12C, 12D, 12E, a Time Division Multiplexing (TDM) layer formed by switches 14X, 14Y, and a control plane 16. Those of ordinary skill in the art will recognize various other network configurations, topologies, etc. that may be contemplated with the network 10. The sites 12A, 12C, 12E are three-way Reconfigurable Optical Add/Drop Multiplexers (ROADMs) (i.e., three-way is equivalent to three degrees.) The site 12B is a two-way ROADM (i.e., two-way is equivalent to two degrees), and the site 12D is an optical line amplifier. Each of the ROADM sites 12A, 12B, 12C, 12E includes fiber connections—one for each way or degree, and equipment configured to switch wavelengths between the degrees. A node can be referred to as an N-degree node where N refers to the number of ingress/egress directions associated with the node. For example, a 2-degree node is connected to two adjacent nodes, a 3-degree node is connected to three adjacent nodes, etc. The ROADM can include a Wavelength Selective Switch (WSS), 1:N multiplexers/demultiplexers, etc. Any type of instantiation of the ROADM is contemplated herein. Additionally, the site 12E has an intermediate regenerator 18 between the site 12A and the site 12D for optical-electrical-optical (OEO) regeneration. Note, the regenerator 18 is an OEO conversion point. The switches 14X, 14Y can be packet-optical switches or the like which can provide OTN connections therebetween. The sites 12 are configured through the ROADMs to provide wavelength connectivity and switching therebetween, and the switches 14X, 14Y are configured to provide TDM and packet switching therebetween. Note, various other components can be included in the network 10 which are omitted for illustration purposes.

The control plane 16 can include, without limitation, ASON, GMPLS, OSRP, etc. The control plane 16 is configured to implement software, processes, algorithms, etc. that control configurable features of the network 10, such as automating discovery of the sites 12 and the switches 14, capacity on the links between the sites 12, port and wavelength availability on the sites 12 and the switches 14, connectivity between ports; dissemination of topology and bandwidth information between the sites 12 and the switches 14; path computation and creation for connections; network level protection and restoration; and the like. As part of these functions, the control plane 16 can include a topology database that maintains the current topology of the network 10 based on control plane signaling and a connection database that maintains available bandwidth on the links again based on the control plane signaling. The control plane 16 can a distributed control plane; thus a plurality of the controllers (e.g., located at the sites 12, 14) can act together to operate the control plane 16 using the control plane signaling to maintain database synchronization. In source-based routing, a source node for a connection is responsible for path computation and establishment by signaling in the network 10. For example, the source node can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection can refer to a signaled, end-to-end connection such as a Subnetwork Connection (SNC), Subnetwork Connection Protection (SNCP), Label Switched Path (LSP), etc. Path computation generally includes determining a path, i.e. traversing the links through the network 10 from the source node to the destination node based on a plurality of constraints such as administrative weights on the links, bandwidth availability on the links, etc. The source node can also define the validation constraints that are provided in the setup messages.

In the network 10, an exemplary connection 20 is illustrated between the switches 14X, 14Y through the sites 12A, 12E, 12D, 12C. For illustration purposes, the connection 20 can be an SNC specified by a DTL. Of course, the connection 20 can be any end-to-end signaled connection. Note, the site 12D does not need to be specified necessarily in the DTL since it is an amplifier. The DTL is made up of node, link ID pairs. In the network 10, there are four paths between the sites 12A, 12C, namely through 1) the sites 12A, 12C (un-regenerated), 2) the sites 12A, 12B, 12C (un-regenerated), 3) the sites 12A, 12E, 12C (un-regenerated), and 4) the sites 12A, 12E, 12C (regenerated). Note, the paths 3) and 4) are the same with the difference being the inclusion of the regenerator 18 in the path 4). Note, there can be additional sites, switches, etc. between the sites 12A, 12C and these are omitted for illustration purposes. In this example, the connection 20 is established by the control plane 16 on the path 4), i.e., through the sites 12A, 12E, 12C including the regenerator 18 at the site 12E. That is, the control plane 16 has established the connection 20 via a call and can redial the connection 20 in the event of a failure.

For the connection 20, optical-electrical conversion points include the sites 12A, 12E, 12C. That is, there is an Optical Multiplex Section (OMS) between the sites 12A, 12E and the sites 12E, 12D. Specifically, at the site 12A, the three-way ROADM interconnects to the switch 14X, at the site 12E, the regenerator 18 is connected to the three-way ROADM, and at the site 12C, the three-way ROADM interconnects to the switch 14Y. The optical-electrical conversion points include optical modems, i.e., transceivers (TR), which provide the OEO conversion. As described herein, at the photonic layer, gracefully adding and removing a call from the network takes time and there are photonic constraints such as the reach of the optical modem. In an exemplary embodiment, the goal of the localized repair systems and methods is to define local repair segment and for the photonic layer, ideally to encompass an EOE segment, i.e., between optical modems.

In FIG. 2, assume the connection 20 experiences a failure of the regenerator 18. Conventionally, without the localized repair systems and methods, the connection 20 is redialed from the source node or head end, e.g., the site 12A. This can include adding a new wavelength on the other paths which may not be desirable in terms of time (to rebalance the photonic layer), photonic constraints, etc. For example, conventionally, the control plane 16 will signal the failure of the regenerator 18 causing a redial of the connection 20 which is removed from its current path, and a new path is determined, e.g., between the sites 12A, 12C direct. A new wavelength is added to the new path requiring a photonic control loop to balance power levels. This process involves the entire network 10, can be time consuming, etc. That is, the control plane 16 reacts to line faults such as the failure of the regenerator 18 and for restoration to occur, the data plane is torn down and re-established. This involves tearing down the path by signaling the removal of the path which for the photonic layer is an expensive (slow) proposition.

In FIG. 3, with the local repair segment, the nearest optical-electrical conversion point can determine the best path and opportunity to perform wavelength conversion. With the localized repair systems and methods, instead of involving the network 10 and redialing the connection through involvement of the head end, the local repair segment selects a new regenerator 18a to locally switch to at the site 12E. Here, the regenerator 18a can include a tunable optical modem which adjusts to the same wavelength as the regenerator 18 and the three-way ROADM at the site 12E switches off the regenerator 18 to the regenerator 18a. In this manner, the failure of the regenerator 18 is addressed locally, without head end involvement and without photonic layer adjustments. The failure of the regenerator 18 is still communicated to the head end, but the head end knows it can simply re-dial the connection 20 over the same path with a different connection point at the site 12E using the regenerator 18a. The concept of the local repair segment constrains the repair to the local repair segment instead of redialing a connection. Here, at the photonic layer, the local repair segment is between optical-electrical conversion points. When there is a failure associated with a regenerator path at a local node, the failed regenerator equipment is substituted with working equipment, without notifying the network or the head-end node.

Figure 4:
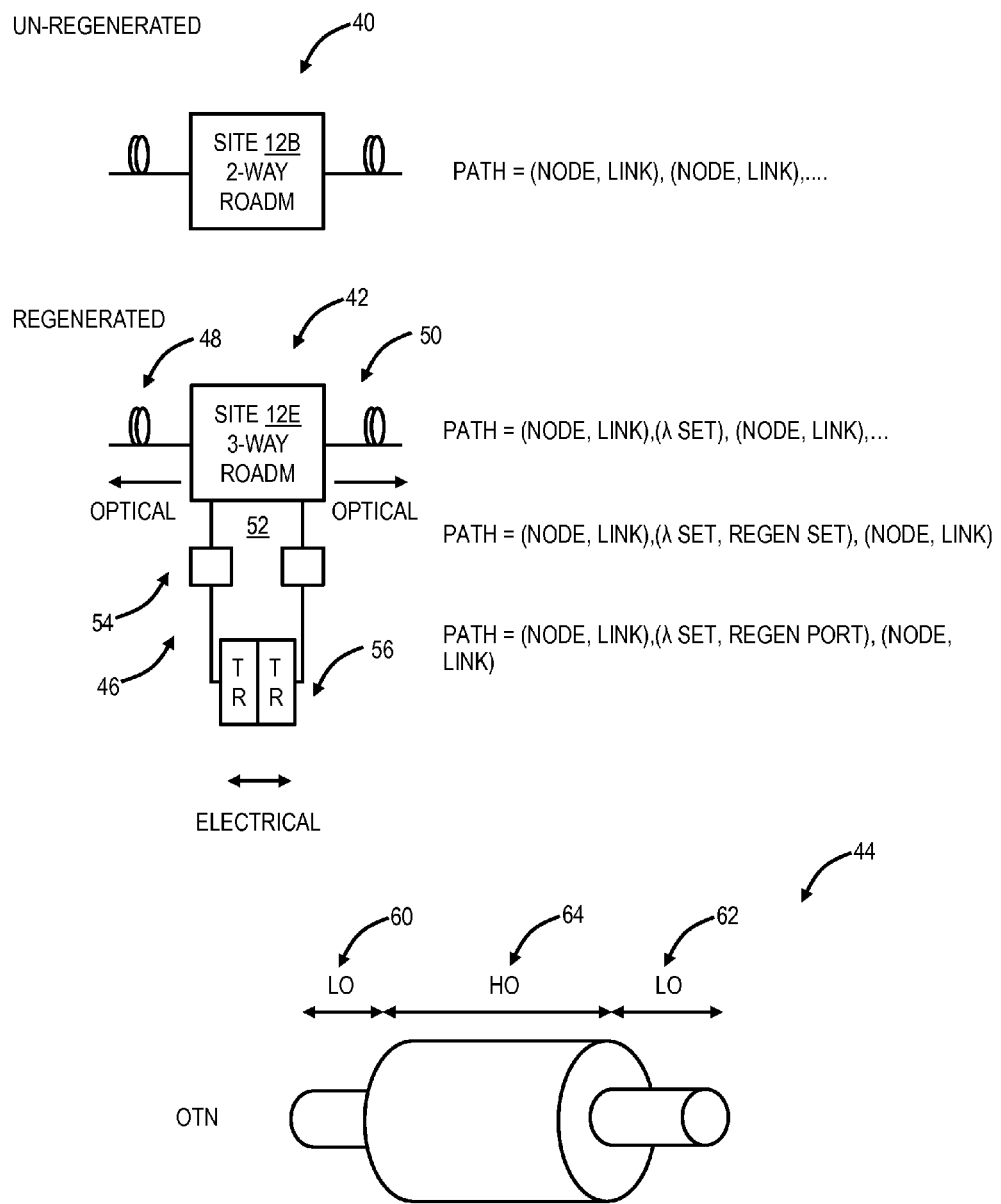
FIG. 4 is a diagram of network models for determining local repair segment boundaries for the localized repair systems and methods.

Referring to FIG. 4, in an exemplary embodiment, diagrams illustrate network models 40, 42, 44 for determining local repair segment boundaries for the localized repair systems and methods. The model 40 is a two-way ROADM site, such as the site 12B in the network 10, the model 42 is a three-way ROAM site, such as the site 12E in the network 10, and the model 44 is a logical diagram of an OTN connection. The models 40, 42 relate to the photonic layer, and the model 44 relates to the OTN layer. With respect to the photonic layer and the OTN layer, the local repair segment is based on where something interesting occurs that makes this segment amenable to a localized repair. Specifically, this is not necessarily a single link, but a segment. For the photonic layer, the boundary points for the local repair segment in the photonic layer can be optical-electrical conversion points. Specifically, the local repair segment in the photonic layer can be an EOE segment. Here, the local repair can be changing one of the "E's" in the EOE. In the photonic layer, the following terminology can be used to define a path:

| | |
|---|---|
| (node, link) | Each hop consists of a Node__Name and exit link__ID pair |
| (λ set) | A set of zero or more wavelengths that can be used on this path: zero means do not change. If only this is specified, then the control plane will select the regen |
| (regen set) | Regen specified down to a card - the control plane will select an available regen on that card |
| (regen port) | Regen is specified down to the exact regen cards |

First, the model 40 does not lend itself to being a boundary point for a local repair segment. Specifically, the model 40 is a two-way ROADM, and there needs to be more than two directions at a site to support a local repair action, i.e., there is no way to support an added OEO function in the model 40 at the photonic layer. For the model 40, there is no optical-electrical conversion, i.e., the control plane 16 views the model 40 simply as a (node, link) in the path. The model 42 includes an optical-electrical conversion point 46. Specifically, the model 42 is a three-way ROADM with two line-side degrees 48, 50, and a local add/drop degree 52. From an OEO perspective, the degrees 48, 50 are optical and the degree 52 is electrical since an OEO operation can be performed at the model 42. The degree 52 can include multiplexer/demultiplexer banks 54 and one or more optical modems 56 (TR) to perform OEO conversion.

From the control plane 16 perspective, the model 42 can specific a path in a variety of ways such as:

Path = (node, link), (λ set), (node, link), . . .
Path = (node, link), (λ set, regen set), (node, link)
Path = (node, link), (λ set, regen port), (node, link)

Here, the path through the model 42 can be any of optical pass-through, lambda conversion, regeneration, etc. Thus, the model 42 can be a book-end on an EOE segment and therefore is an ideal boundary for a local repair segment in the photonic domain. Specifically, since an optical-electrical conversion can occur at the model 42, the photonic layer can be separated here as a point for local repair. Note, while the model 42 is illustrated as a three-way ROADM, the above functionality can apply equally to ROADMs greater than three-way.

For the OTN layer, the boundary points can be OTN HO/LO switching points and the local repair segments can be ODUk/ODUj over OTUk segments. In OTN networks, connections can be either TDM (i.e., ODUj into an OTUk) or a single large client single (i.e., ODUk in OTUk). In the model 44, segments 60, 62 are Low Order (LO) where an ODUk is carried by itself in an ODUk and segment 62 is High Order (HO) where an ODUj is carried multiplexed into an ODUk. In the segments 60, 62, i.e., where there is a single large client, the client's clock (not the node or network element clock) is used for the OTUk clock. This creates an OAM&P transient event when the clock disappears or appears. All of the OTUk and ODUk overhead is unavailable during this transient event and disadvantageously, for a control plane using this overhead, there is a loss of control plane signaling. OTN networks are typically deployed with multiple OTUk rates such as OTU4, OTU3, etc., and an ODU connection may traverse these different rates. For example, in the model 44, there can be an ODU3 connection which is transported in an OTU3 in the segments 60, 62 and multiplexed in an OTU4 in the segment 64. Similar to the photonic layer and associated optical-electrical conversion points, the changeover between the segments 60, 62, 64 can be an ideal boundary for a local repair segment. Here, the OTN network may perform a segmented repair and not have to wait for the OTUk or ODUk GCC to come back. For example, the local repair segment in an OTN network can be a multiplexed zone, i.e., any of the HO segments 64. That is, the localized repair systems and methods for OTN can differentiate between call path that is 1:1 mapped (LO) and when it is multiplexed (HO) with local repair segments created based on these distinctions. If a failure occurs on a multiplexed section, the localized repair systems and methods initially constrain the teardown operations to the multiplexed areas and attempt there. If no path can be found locally, then the tear down can continue to the home node.

Figure 5:
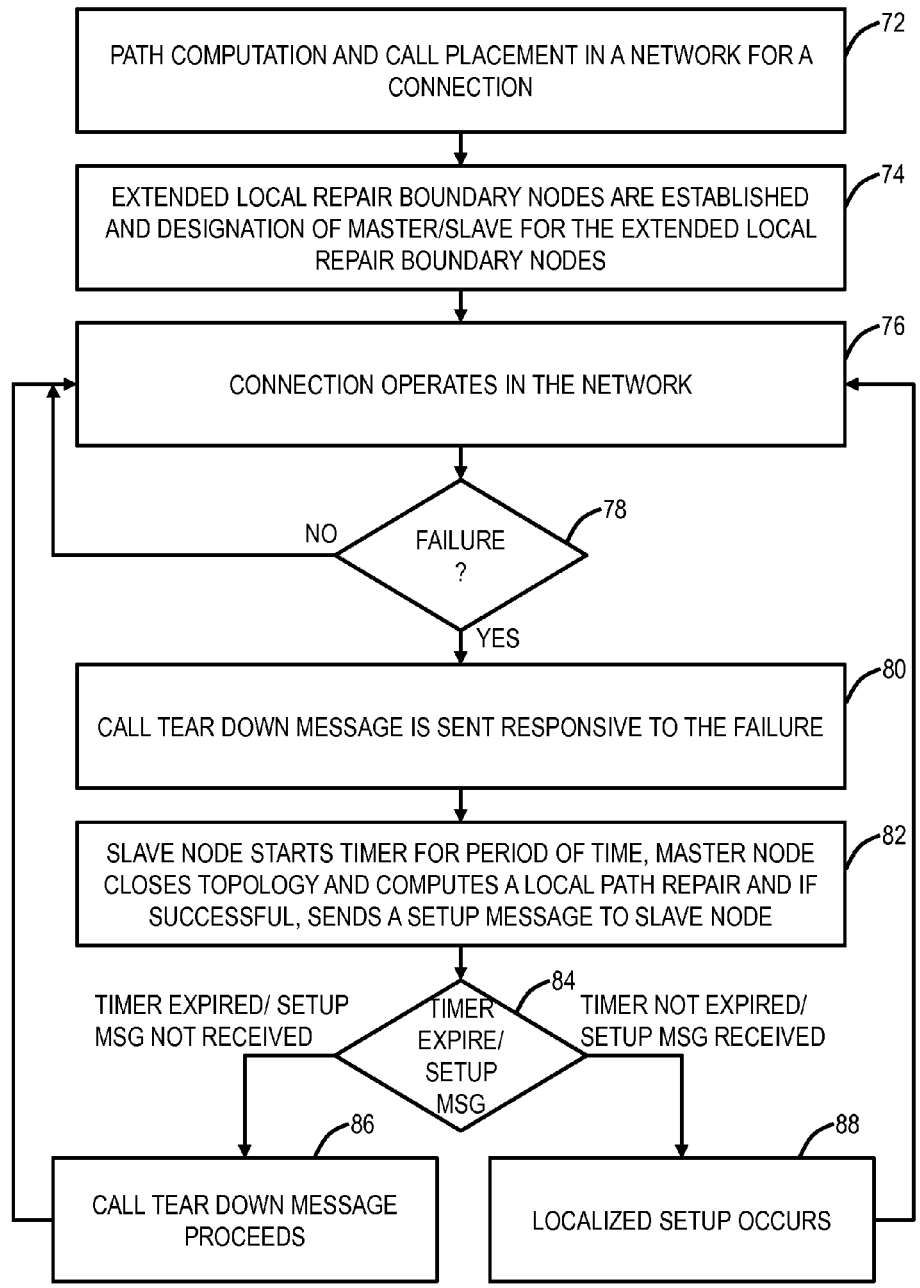
FIG. 5 is a flowchart of a local repair method utilizing the local repair segments.
Figure 6:
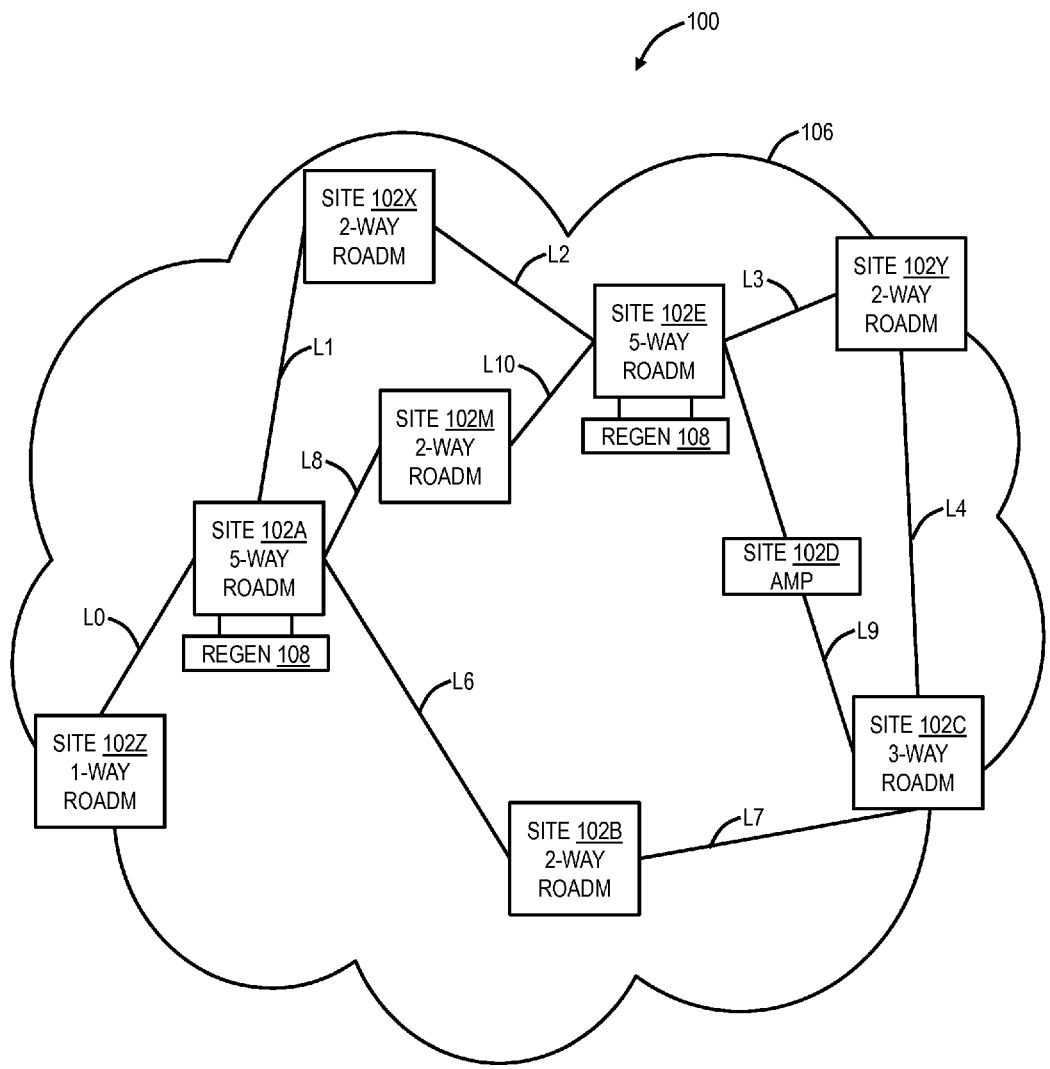
FIGS. 6-10 are network diagrams of a network of various sites for describing exemplary operations of the local repair method of FIG. 5.

Referring to FIG. 5, in an exemplary embodiment, a flowchart illustrates a local repair method 70 utilizing the local repair segments. The local repair method 70 contemplates operation in the network 10 with various defined local repair segments such as defined by the boundaries described herein. Generally, the local repair method 70 can be implemented in any network utilizing a control plane (e.g., ASON, GMPLS, OSRP, etc.) that has identifiable local repair segments. The local repair method 70 provides an ability to remove call teardowns by the control plane when a local repair can be implemented instead of having to redial a call. The local repair method 70 includes path computation and call placement in a network for a connection (step 72). The path computation and call placement can be performed by the control plane, and the network can include a photonic layer, an OTN layer, etc. The local repair method 70 contemplates any path computation technique to compute photonic paths across the network specifically those needing OEO for the purposes of signal regeneration (for viability) or wavelength conversion (to overcome wavelength blocking) The local repair method 70 contemplates any path computation technique to compute TDM paths such as for OTN SNCs, LSPs, etc. The call placement can be done via existing techniques in the control plane to signal and establish a connection.

In the local repair method 70, extended local repair boundary nodes are established and there is a designation of master/slave for the extended local repair boundary nodes (step 74). The step 74 can be performed before, during, or after the call is established in the step 72. Here, extended local repair boundaries nodes are established such as based on the description in FIG. 4. For identifying the extended local repair boundary nodes, at the photonic layer, these are nodes where there is optical-electrical conversion. For example, for a photonic connection, the extended local repair boundaries nodes could include at least 2 ROADM nodes with directionality >2. In an exemplary embodiment, regenerator sites can be selected as boundary points at they can provide wavelength conversion as well. For an OTN connection, the extended local repair boundaries nodes are where an ODU connection is multiplexed. Thus, in the photonic layer, the local repair segment is an EOE segment, and in the OTN layer, the local repair segment is a multiplexed segment. The extended local repair boundaries nodes are at ends of the local repair segment and one of these nodes is designated as a master node and the other as a slave node. This designation can be based on the call signaling order, on control plane node ID (e.g., lower number ID is the master), etc. With the connection established and the local repair segments and extended local repair boundaries nodes designated, the connection can operate in the network (step 76). This is steady state operation for the connection, i.e., no failures. If there is a failure (as determined in step 78), a call tear down message is sent responsive to the failure (step 80).

Note, the local repair method 70 can be implemented for any failure in the network, but the local repair is only performed if the failure is within one of the local repair segments as defined by the master nodes and the slave nodes. Assuming the failure is with a local repair segment, a slave node starts a timer for period of time (e.g., a predetermined time period such as 250 ms, etc., and a master node closes topology and computes a local path repair and if successful, sends a setup message to slave node (step 82). Additionally, when the call tear down message reaches the master node or the slave node, it is halted, i.e., not forwarded. For example, the master node and/or the slave node can receive the call tear down message and determine if the associated failure is within their associated local repair zone. If so, the master node and/or the slave node hold/store the call tear down message to attempt local repair. In this manner, the control plane is involved in signaling the call tear down message, but the master node and/or the slave node hold this call tear down message to first attempt the local repair.

In the local repair, the master node is responsible for closing the topology. The slave waits for the period of time (e.g., 250 ms, etc.), and if no setup message from the master node is received during this period of time, then the call tear down message continues (step 84). The master node can attempt to close the topology and compute a local repair path. If none is found by the master node, the call tear down message continues. In the case where the slave node finds the time expire or the master node is unable to find the local repair path, the call tear down message continues to the head end or originating/source node for call teardown and redialing as per normal control plane behavior in a failure scenario (step 86). If the master node finds a path, a setup message is signaled to the slave node and localized setup occurs (step 88). Here, the call tear down message is halted and does not need to continue since the master node and the slave node will do the local repair without requiring call teardown and redial. The source node learns of the repair by the typical mechanism in the control plane. Thus, the local repair method 70 is fully contained within the control plane and acts as an adjunct repair method that is first attempted to avoid having to fully teardown a call.

Figure 7:
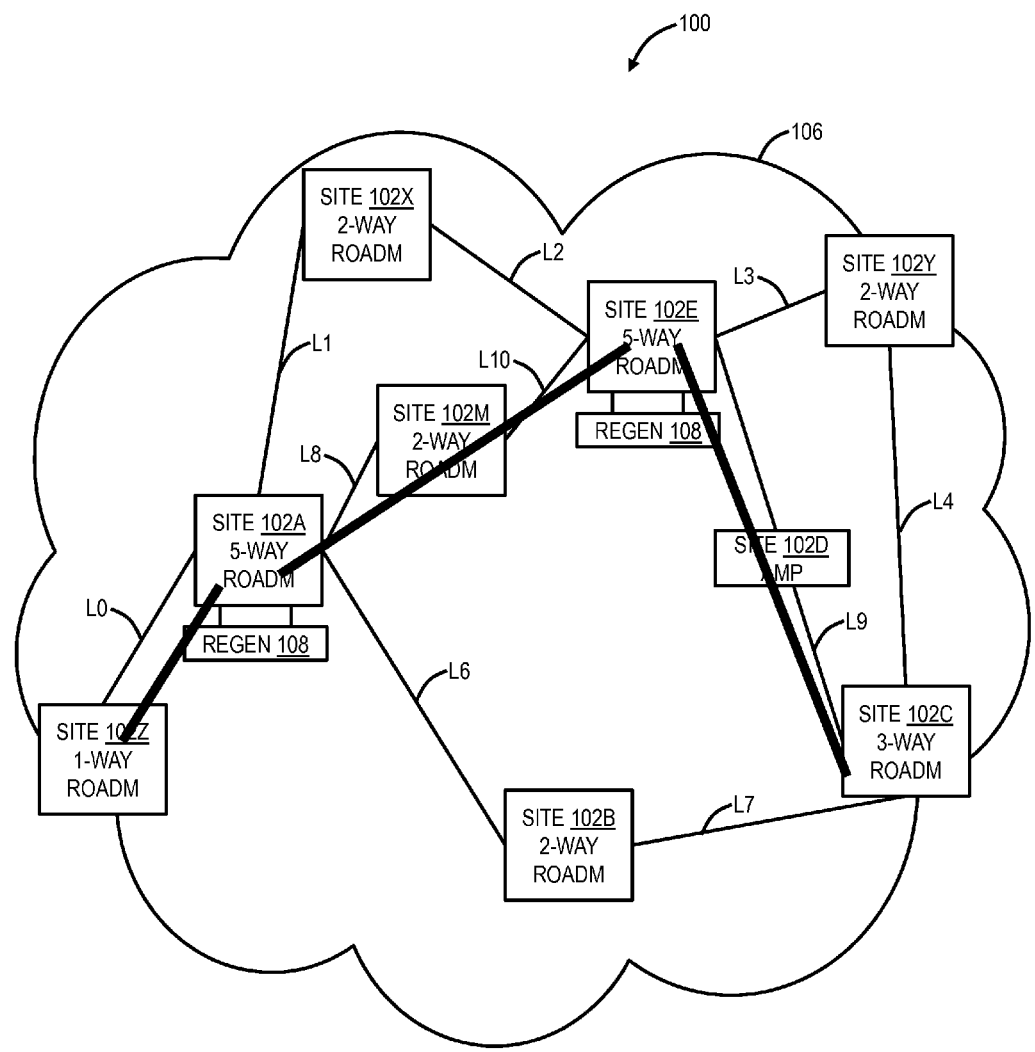

Referring to FIGS. 6-10, in exemplary embodiments, network diagrams illustrate a network 100 of various sites 102 for describing exemplary operations of the local repair method 70. The network 100 includes sites 102A, 102B, 102C, 102D, 102E, 102M, 102X, 102Y, 102Z which are interconnected by links L0-L10 in a meshed fashion. For ease of illustration, no underlying equipment is shown, but those of ordinary skill in the art will recognize that the various sites 102 can include switches, DWDM equipment, etc. to form the photonic layer and the OTN layer. The network 100 includes a control plane 106 which can be ASON, GMPLS, OSRP, etc. Also, the network 100 includes two five-way ROADM sites 102A, 102E which have local regenerators 108. In FIG. 7, a connection is established between the site 102Z and the site 102C with an associated Designated Transit List (DTL). Note DTL is used in PNNI, ASON, OSRP, and a similar concept in GMPLS is an Explicit Route Object (ERO). Since the sites 102A, 102E can be local repair boundary nodes, the DTL can be configured independently per EOE segment and then cascaded. Specifically, for the connection in FIG. 7, the DTLs include:

| | |
|---|---|
| DTL-1-1 | (site 102Z, L0) |
| DTL-1-2 | (site 102A, L8, site 102M, L10, site 102E) |
| DTL-1-3 | (site 102E, L9, Site 102C) |
| CacsDTL-1-1 | DTL-1-1 + DTL-1-2 + DTL-1-3 |

Figure 8:
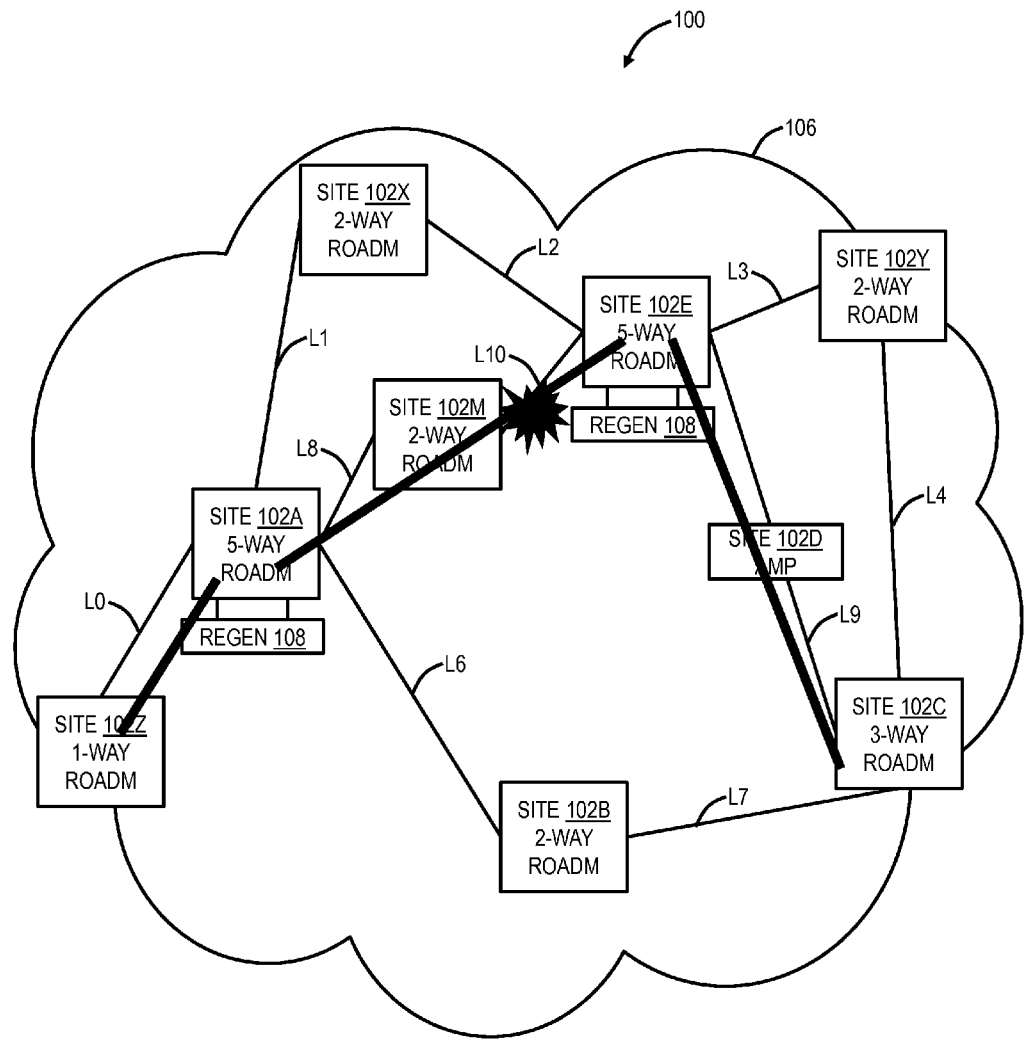
Figure 9:
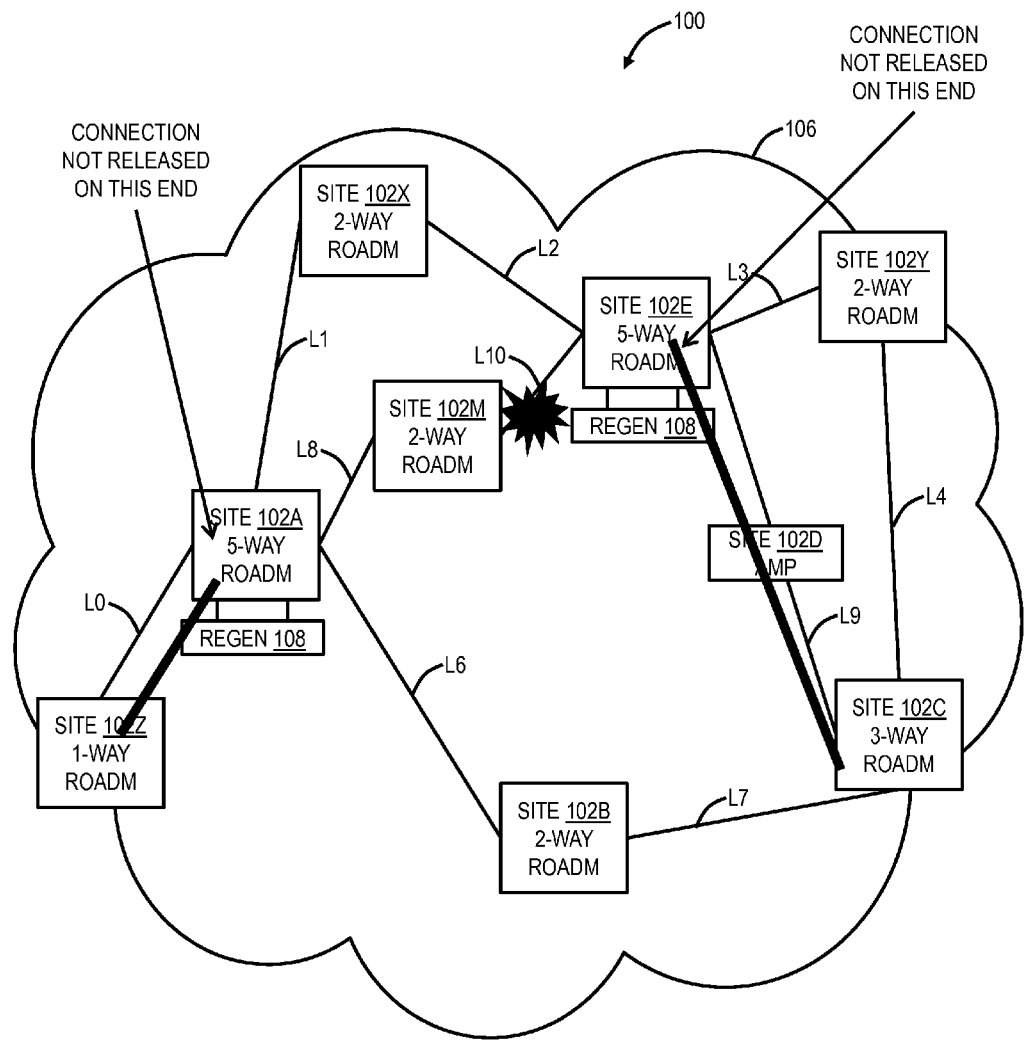
Figure 10:
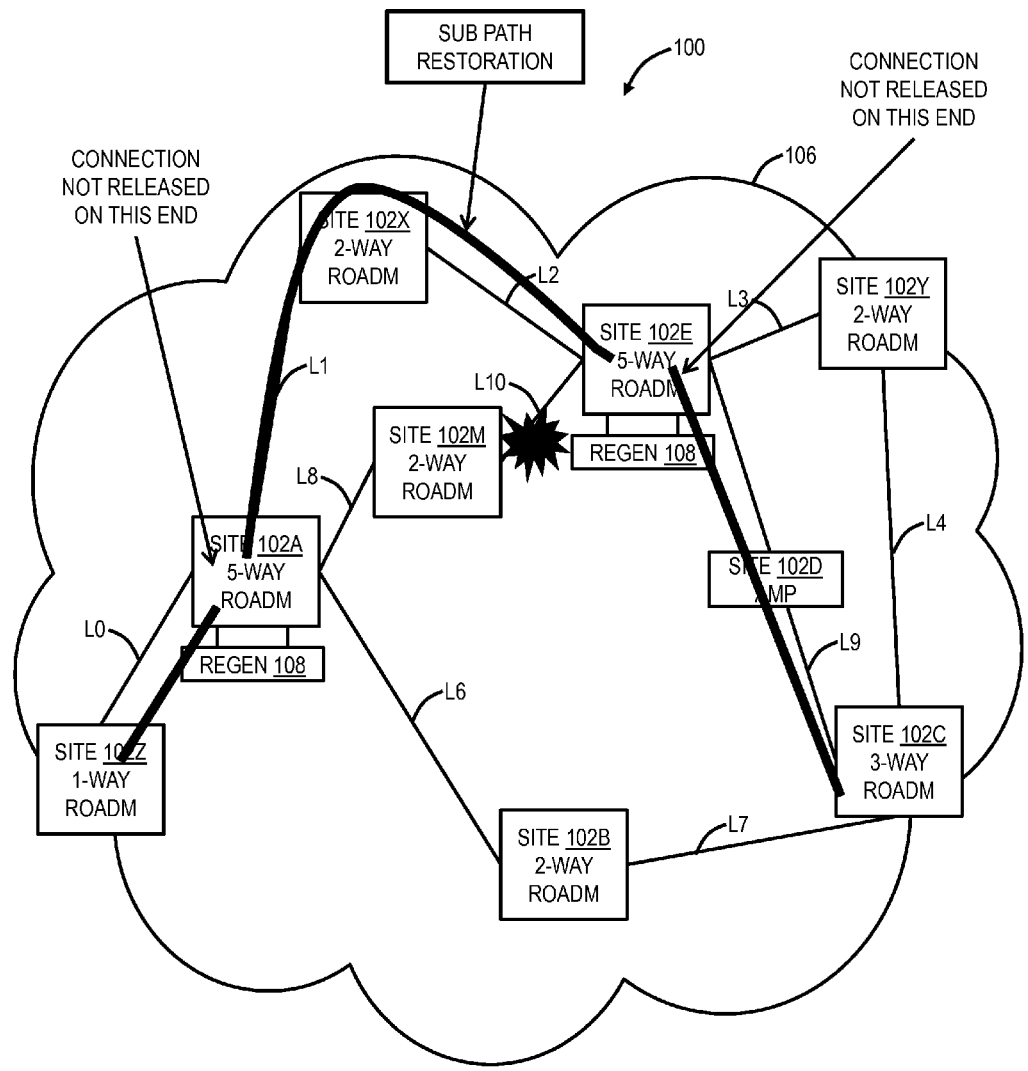

From the photonic layer perspective, each of the DTLs—DTL-1-1, DTL-1-2, DTL-1-3 can be a local repair segment. That is, assume the sites 102A, 102E include OEO regeneration, each of the DTLs—DTL-1-1, DTL-1-2, DTL-1-3 is a separate photonic segment from a wavelength perspective for optimization. In FIG. 8, assume there is a failure on the link L10. Subsequent to the failure, a call teardown is generated by the control plane 106, but held at the sites 102A, 102E as shown in FIG. 9. Specifically, the connection is not released on the DTL-1-1 and the DRL-1-3 while the local repair method 70 is implemented. For example, assume the master node is the site 102A (e.g., lower node ID) and the slave node is the site 102E. The call teardown is held at the sites 102A, 102E for the period of time and the site 102A computes an alternate path, e.g., a DTL-2-2 of (site 102A, L1, site 102X, L2, site 102E). This path is signaled between the site 102A and the site 102E, and the connection is restored on a sub-path of the DTL-2-2 as shown in FIG. 10. Thus, the idea is to reroute the sub-path in the cascaded DTL, CacsDTL, so the service would tear down on L8, L10 and would be created on sub-path L1 and L2. This sub-Path can be reconfigured or computed through an in-skin or external Path Computation Element (PCE) or explicitly programmed/provided by a user.

Again, one advantage of this approach is that photonic optimization is run independently on EOE segments, e.g., the DTLs—DTL-1-1, DTL-1-2, DTL-1-3, and thus this approach gives better restoration times and less power transients/variations in a network—since only one segment requires photonic optimization. Also, retune/wavelength conversion decisions can be made locally on the segment to work around wavelength blocking, e.g., a different wavelength is needed on the DTL-2-2 from the DTL-1-2. Thus, the advantage of wavelength conversation can be leveraged as well and the two sub-paths may be calculated independently of wavelength continuity. This is beneficial when restoration can be achieved on a different wavelength due to wavelength continuity blocking Another advantage of the localized repair systems and methods is it reduces and localizes the impact of a failure to a smaller part of the network. Also, this can provide a deterministic model to a user, who can even control it through explicit provisioning.

Additionally, this same model can be used in a multi-layer control plane, e.g., photonic and OTN. Paths in different layers can be considered separately and a cascaded DTL can be created and used similarly to the concept described earlier. For OTN HO Connections, i.e., ODUj multiplexed in OTUk, links can be designated for segment restoration. This reduces the span of OTN transient Protocol. For example, in the same example as FIGS. 6-10, assume the connection is an ODU3, and on the DTL-1-1 and the DTL-1-3, it is carried in an OTU3 (i.e., LO), and on the DTL-1-2, the ODU3 is multiplexed into an ODU4 (i.e., a HO). Thus, the DTL-1-2 is a local repair segment in the OTN domain. The same operations can occur as shown in FIGS. 6-10 and the advantage is the transients are reduced as the control plane is not lost on the other DTLs—DTL-1-1, DTL-1-3.

Figure 11:
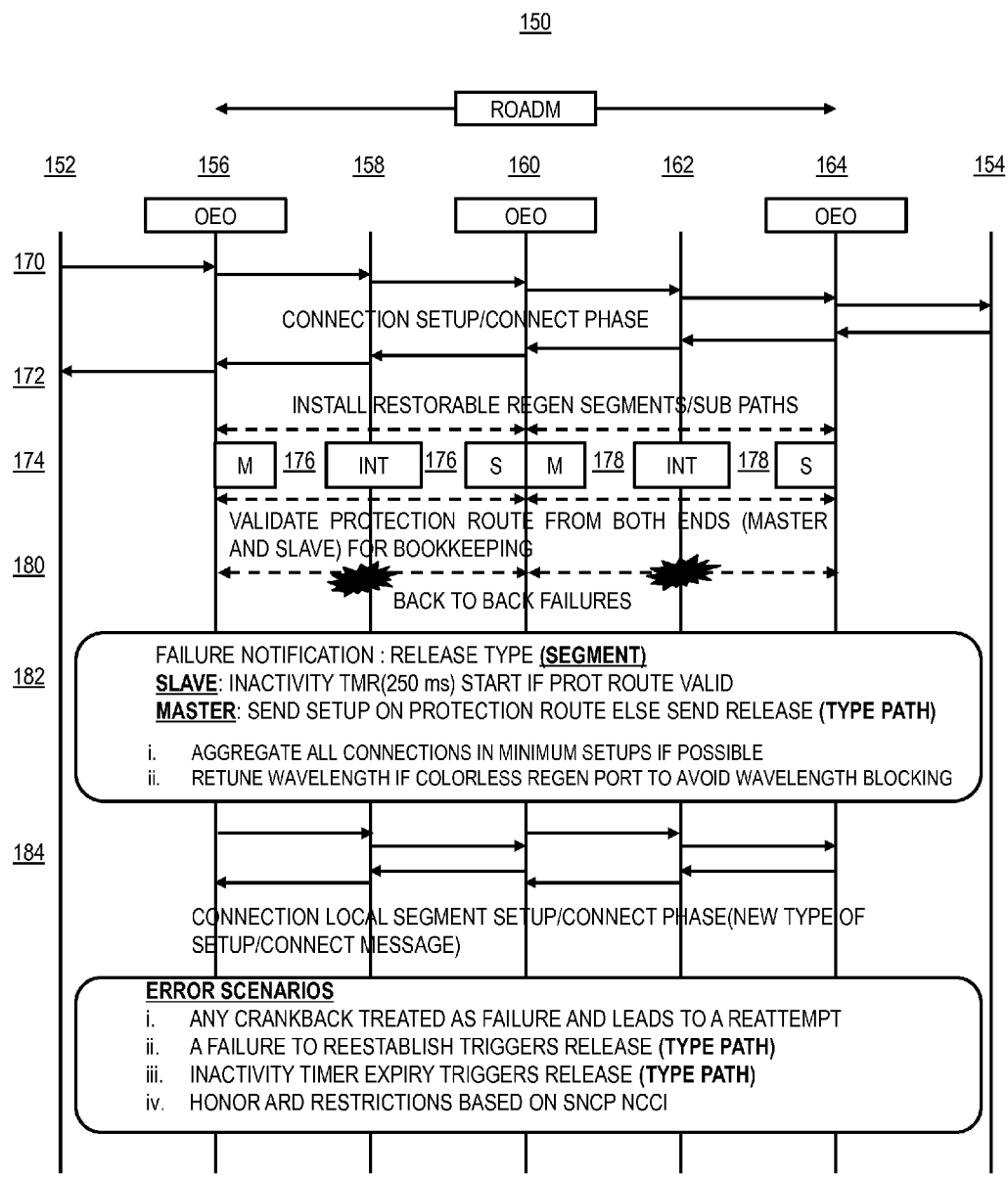
FIG. 11 is a timing diagram of operation of a connection between two sites with the localized repair systems and methods.

Referring to FIG. 11, in an exemplary embodiment, a timing diagram illustrates operation of a connection 150 between two nodes 152, 154 with the localized repair systems and methods. In this example, there are intermediate nodes 156, 158, 160, 162, 164 between the end nodes 152, 154 with the nodes 156, 160, 164 being OEO points. At first time 170, the connection 150 is signaled from the source node 152 to the destination node 154 through all of the intermediate nodes 156, 158, 160, 162, 164, e.g., a connection setup message. Assuming each node is capable of supporting the connection, the connection setup message is passed along to each subsequent node to the destination node 154 which in turn creates a connect message, e.g., an ACK message, and a connect phase begins at time 172. This connect message is passed similarly from the destination node 154 to the source node 152 through all of the intermediate nodes 156, 158, 160, 162, 164.

At a time 174, local repair segments 176, 178 are installed/defined, i.e. restorable regenerator segments, sub-paths, EOE segments, HO segments, etc. In this example, the local repair segments are between the nodes 156, 160 (local repair segment 176) and the nodes 160, 164 (local repair segment 178). Note, not every segment has to have a local repair segment, e.g., the segments between the nodes 152, 156 and the nodes 164, 154 do not have a local repair segment. In this example, the node 156 is designated the master node and the node 160 is the slave node for the local repair segment 176 and the node 160 is designated the master node and the node 164 is the slave node for the local repair segment 178. For example, the master/slave designation is based on Node ID, egress/ingress ports, etc. Note, the local repair segments 176, 178 can be determined before, during, or after the times 170, 172. For example, the initial connection setup can install the restorable segments attribute on respective nodes, i.e., master/slave/intermediate (INT).

The local repair segments 176, 178 can validate protection routes for their associated segments from both ends (the master node and the slave node) for bookkeeping periodically, e.g., protection segment route is validated for both link as well as bundle diversity. The local repair segments 176, 178 each include the master node, the slave nodes, and one or more intermediate nodes (INT) for a restorable segment. At a time 180, there are back-to-back failures affecting the nodes 158, 162 and the associated local repair segments 176, 178. Subsequently, at a time 182, the local repair method 70 can be implemented. There is a failure notification and release sent on each of the local repair segments 176, 178 since the failures occur here. Note, the nodes 156, 160, 164 will hold these associated messages per the local repair method 70. For the local repair segment 176, the slave node 160 starts an inactivity timer (e.g., 250 ms) and may only start this if the protect route for the local repair segment 176 is valid based on the bookkeeping (if not, there is no local repair and the release message is not held). The master node 156 sends a setup on the protect route (if valid) otherwise the release message is sent, not held. This same process is implemented on the local repair segment 178 as well.

The local repair can include aggregating all connections in to minimize setup, if possible, as well as retuning wavelengths on a colorless regenerator port to avoid wavelength blocking. At a time 184, the local setup messages are provided on the local repair segments 176, 178 while the network-wide release messages are held, and service is restored for the connection 150 via local repair instead of redial to the source node 152. Note, this can be a new type of setup/connect message in the control plane 16, 106 for the master node and the slave node. The types of error scenarios of the local repair can include any crankback treated as a failure and leads to a reattempt, a failure to reestablish triggers release (type path), inactivity timer expiry triggers release (type path), and Absolute Route Diversity (ARD) restrictions.

The local repair segments 176, 178 can include various signaling attributes that are done within the control plane 16, 106. First, initial connection setup signaling installs the restorable segments attribute on respective nodes, i.e., master, slave, intermediate. Second, the protection segment route for the local repair segments 176, 178 is validated for both link as well as bundle diversity. Third, the master/slave determination is signaled based on associated criteria. Fourth, release messages are generated on the local repair segments 176, 178 such as i) TYPE SEGMENT RELEASE Triggered (ALL Conditions), ii) SEGMENT RELEASE triggers the SEGMENT RESTORATION on Master/Slave, but tear down on INT nodes, iii) PATH RELEASE triggers tear down complete path, iv) PATH RELEASE used only for error scenarios during segment restoration, v) CALLREF (Different Call-Ref range used to avoid contention). Finally, both the master node and the slave node can do periodic status check of protection route based on their routing database, to decide whether to send SEGMENT SETUP or start INACT TMR respectively.

Figure 12:
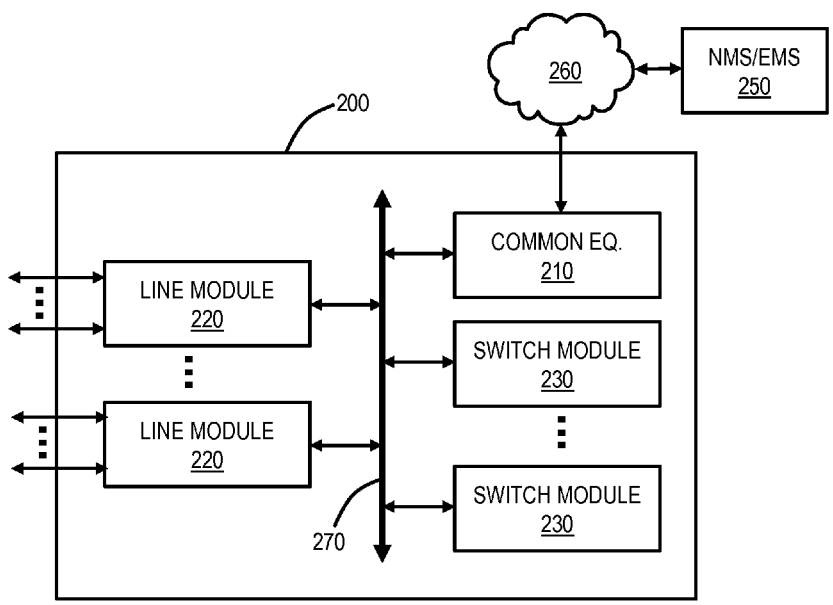
FIG. 12 is a block diagram of an exemplary node for use with the localized repair systems and methods described herein.

Referring to FIG. 12, in an exemplary embodiment, a block diagram illustrates an exemplary node 200 for use with the localized repair systems and methods described herein. In an exemplary embodiment, the exemplary node 200 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the node 200 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, a ROADM, etc. For example, the node 200 can be any digital system with ingress and egress digital signals and switching therebetween of channels, timeslots, tributary units, etc. Additionally, the node 200 can be any optical system with ingress and egress optical signals and switching therebetween of wavelengths. Of course, the node 200 can be both digital and optical.

In an exemplary embodiment, the node 200 includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the common equipment 210 can include a control plane processor, such as a controller 300 illustrated in FIG. 13, configured to operate the control plane 16, 106 as described herein. The node 200 can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and to external connections on the links 120 to/from the node 200. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc. In the optical system, the line modules 220 can be optical modems and the switching can be via ROADM components.

Further, the line modules 220 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between. The line modules 220 can include wavelength division multiplexing interfaces, short reach interfaces, and the like, and can connect to other line modules 220 on remote network elements, end clients, edge routers, and the like, e.g. forming connections on the links 120. From a logical perspective, the line modules 220 provide ingress and egress ports to the node 200, and each line module 220 can include one or more physical ports. The switch modules 230 are configured to switch channels, timeslots, tributary units, packets, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 230 can include Time Division Multiplexed (TDM) (i.e., circuit switching) and/or packet switching engines. The switch modules 230 can include redundancy as well, such as 1:1, 1:N, etc. In an exemplary embodiment, the switch modules 230 provide OTN switching and/or wavelength switching.

Those of ordinary skill in the art will recognize the node 200 can include other components which are omitted for illustration purposes, and that the systems and methods described herein are contemplated for use with a plurality of different network elements with the node 200 presented as an exemplary type of network element. For example, in another exemplary embodiment, the node 200 may not include the switch modules 230, but rather have the corresponding functionality in the line modules 220 (or some equivalent) in a distributed fashion. For example, as a ROADM, there may not be digital components, only optical. For the node 200, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane 130. Furthermore, the node 200 is merely presented as one exemplary node 200 for the systems and methods described herein.

In an exemplary embodiment, a network can include a plurality of the nodes 200; a plurality of links interconnecting the plurality of nodes (e.g., photonic links, OTN links, etc.); at least two nodes of the plurality of nodes including three or more degrees; a control plane operated between the plurality of nodes (e.g., the control plane 16, 106); a connection including a path through some of the plurality of links between two nodes of the plurality of nodes, one of the two nodes is a source node and another of the two nodes including a destination node, and wherein the path includes the at least two nodes; and a local repair segment defined between the at least two nodes, wherein upon a failure in the local repair segment, control plane signaling to tear down the connection is halted within the local repair segment such that a local repair is attempted first, and if the local repair is unsuccessful, the control plane signaling to tear down the connection is release for a tear down of the connection and a redial.

Figure 13:
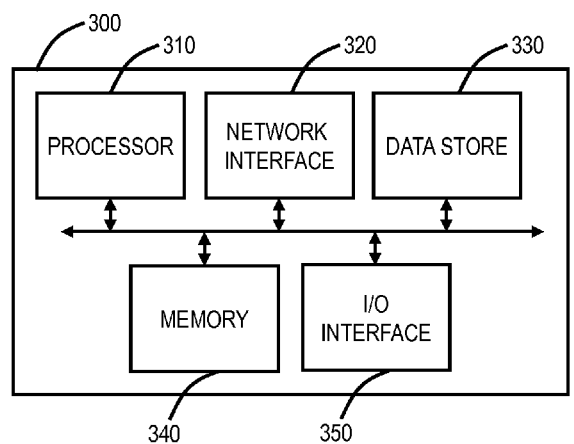
FIG. 13 is a block diagram of an exemplary controller to provide control plane processing and/or operations, administration, maintenance, and provisioning (OAM&P) for the node of FIG. 12.

Referring to FIG. 13, in an exemplary embodiment, a block diagram illustrates a controller 300 to provide control plane processing and/or operations, administration, maintenance, and provisioning (OAM&P) for the node 200. The controller 300 can be part of common equipment, such as common equipment 210 in the node 200, or a stand-alone device communicatively coupled to the node 200 via the DCN 260. The controller 300 can include a processor 310 which is hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within memory, to communicate data to and from the memory, and to generally control operations of the controller 300 pursuant to the software instructions. The controller 300 can also include a network interface 320, a data store 330, memory 340, an I/O interface 350, and the like, all of which are communicatively coupled therebetween and with the processor 310.

The network interface 320 can be used to enable the controller 300 to communicate on the DCN 260, such as to communicate control plane information to other controllers, to the management system 250, and the like. The network interface 320 can include, for example, an Ethernet card (e.g., 10BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate to other devices. Further, the I/O interface 350 includes components for the controller 300 to communicate with the other nodes, such as using overhead associated with OTN signals.

In an exemplary embodiment, the controller 300 is configured to communicate with other controllers 300 in the network 100 to operate the control plane 16, 106 for control plane signaling. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 300 is configured to operate the control plane 16, 106 in the network 100. That is, the controller 300 is configured to implement software, processes, algorithms, etc. that control configurable features of the network 10, such as automating discovery of the nodes 200, capacity on the links, port availability on the nodes 200, connectivity between ports; dissemination of topology and bandwidth information between the nodes 200; path computation and creation for connections; network level protection and restoration; and the like. As part of these functions, the controller 300 can include a topology database that maintains the current topology of the network 10 based on control plane signaling (e.g., HELLO messages) and a connection database that maintains available bandwidth on the links again based on the control plane signaling. Again, the control plane 16, 106 is a distributed control plane; thus a plurality of the controllers 300 can act together to operate the control plane 16, 106 using the control plane signaling to maintain database synchronization. In source-based routing, the controller 300 at a source node for a connection is responsible for path computation and establishing by signaling other controllers 300 in the network 10. For example, the source node and its controller 300 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links through the nodes 200 from the source node to the destination node based on a plurality of constraints such as administrative weights on the links, bandwidth availability on the links, etc.

In an exemplary embodiment, the controller 300 can be an in-skin or external PCE. The controller 300 can include an interface communicatively coupled to one or more nodes in a network (e.g., a backplane interface, a network interface, etc.); a processor communicative coupled to the interface; and memory storing instructions that, when executed, cause the processor to: compute a path for a connection in the network responsive to signaling from a control plane; and define local repair segments on the connection in the network based on boundary points in the path where the connection has an ability for local repair, the boundary points including any of optical-electrical conversion points or Optical Transport Network multiplexing points, and wherein the control plane is configured, upon a failure in the local repair segments, to attempt a local repair first without network-wide involvement.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer executable instructions stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A localized repair method in a network using a control plane, comprising: responsive to a failure on a local repair segment defined on a connection traversing the network, generating a release message in the control plane, wherein the local repair segment is one of (i) between optical-electrical conversion points of the connection and (ii) a High Order (HO) Optical Transport Network (OTN) multiplexing segment of the connection, and wherein the local repair segment comprises multiple spans that are determined based on an attribute of either a photonic domain for (i) or an OTN domain for (ii); attempting a local repair on the local repair segment; if the local repair is unsuccessful, transmitting the release message to redial the connection; and if the local repair is successful, signaling a new sub-path based on the local repair.

2. The localized repair method of claim 1, wherein the local repair comprises:
    releasing the connection on the local repair segment while maintaining the connection outside of the local repair segment; and
    installing the new sub-path in the local repair segment.

3. The localized repair method of claim 1, wherein the local repair segment is between two boundary nodes on a path of the connection, and wherein the boundary nodes are nodes with three or more degrees.

4. The localized repair method of claim 3, further comprising:
    designating one of the two boundary nodes to perform the local repair and signal the other of the two boundary nodes.

5. The localized repair method of claim 1, further comprising:
    changing a wavelength in the new sub-path to avoid wavelength blocking.

6. The localized repair method of claim 1, wherein the release message is stored at the local repair segment while the local repair is performed to ensure that network-wide involvement is avoided unless the repair is unsuccessful.

7. The localized repair method of claim 1, wherein the connection is one of a Subnetwork Connection (SNC), Subnetwork Connection Protection (SNCP), and a Label Switched Path (LSP).

8. The localized repair method of claim 1, wherein the failure is a regenerator failure at a boundary node of the local repair segment and the local repair comprises switching to another regenerator located at the boundary node with a wavelength retuned thereon.

9. The localized repair method of claim 1, wherein the local repair is determined as unsuccessful based on any of a crankback in setup in the local repair, an inactivity timer expiration, and violating Absolute Route Diversity requirements.

10. A controller, comprising: an interface communicatively coupled to one or more nodes in a network; a processor communicative coupled to the interface; and memory storing computer-executable instructions that, when executed, cause the processor to: obtain a path for a connection in the network operating a control plane; and utilize local repair segments on the connection in the network based on boundary points in the path, wherein the boundary points are nodes between which the connection has an ability to be locally repaired, wherein the boundary points are any of optical-electrical conversion points or Optical Transport Network (OTN) multiplexing points, and wherein the control plane is configured, upon a failure in the local repair segments, to attempt a local repair first without network-wide involvement, wherein the local repair segments are determined based on one of i) optical-electrical conversion points of the connection and ii) on High Order (HO) Optical Transport Network (OTN) multiplexing segments of the connection in the network, and wherein the local repair segment comprises multiple spans that are determined based on an attribute of either a photonic domain for (i) or an OTN domain for (ii).

11. The controller of claim 10, wherein, responsive to the failure, a wavelength in the local repair segment is changed to avoid wavelength blocking.

12. The controller of claim 10, wherein, in the local repair segments, network-wide signaling of a release message is constrained until the local repair fails or if the local repair is successful to avoid network-wide involvement in the failure for the connection during the local repair.

13. The controller of claim 10, wherein the failure is a regenerator failure at one of the boundary points and the local repair comprises switching to another regenerator located at the one of the at boundary points with a wavelength retuned thereon.

14. The controller of claim 10, wherein the local repair is determined unsuccessful based on any of a crankback in setup in the local repair, an inactivity timer expiration, and violating Absolute Route Diversity requirements.

15. A network, comprising: a plurality of nodes; a plurality of links interconnecting the plurality of nodes; a control plane operated between the plurality of nodes; a connection with a path through some of the plurality of links between two nodes of the plurality of nodes, one of the two nodes is a source node and another of the two nodes is a destination node, and wherein the path includes two boundary nodes; and a local repair segment defined on the path between the two boundary nodes, wherein, upon a failure in the local repair segment, control plane signaling to tear down the connection is store within the local repair segment such that a local repair is attempted first, and if the local repair is unsuccessful, the control plane signaling is released for a tear down of the connection and a redial, wherein the two boundary nodes are any of optical-electrical conversion points or Optical Transport Network (OTN) multiplexing points, and wherein the local repair segment comprises multiple spans that are determined based on an attribute of either a photonic domain for (i) or an OTN domain for (ii).

* * * * *